US012518624B2

(12) United States Patent
Campbell et al.

(10) Patent No.: US 12,518,624 B2
(45) Date of Patent: Jan. 6, 2026

(54) SYSTEM AND METHOD FOR MANAGING TRAFFIC AT A WORKSITE

(71) Applicant: SITE 2020 INCORPORATED, Dartmouth (CA)

(72) Inventors: Cole Benjamin Campbell, Hubley (CA); Mitchell Alexander Hollohan, Halifax (CA)

(73) Assignee: SITE 2020 INCORPORATED, Fall River (CA)

( * ) Notice: Subject to any disclaimer, the term of this patent is extended or adjusted under 35 U.S.C. 154(b) by 0 days.

(21) Appl. No.: 18/307,922

(22) Filed: Apr. 27, 2023

(65) Prior Publication Data

US 2024/0078902 A1 Mar. 7, 2024

Related U.S. Application Data

(63) Continuation of application No. 17/337,736, filed on Jun. 3, 2021, now Pat. No. 11,670,166, which is a continuation of application No. 16/369,910, filed on Mar. 29, 2019, now Pat. No. 11,055,993, which is a continuation of application No. 15/455,595, filed on Mar. 10, 2017, now Pat. No. 10,249,186.

(60) Provisional application No. 62/306,840, filed on Mar. 11, 2016.

(51) Int. Cl.
*G08G 1/0955* (2006.01)
*G08G 1/08* (2006.01)

(52) U.S. Cl.
CPC ............. *G08G 1/0955* (2013.01); *G08G 1/08* (2013.01)

(58) Field of Classification Search
None
See application file for complete search history.

(56) References Cited

U.S. PATENT DOCUMENTS

| | | | | |
|---|---|---|---|---|
| 3,729,706 | A | 4/1973 | Hein | |
| 7,890,126 | B2 * | 2/2011 | Benco | H04L 63/08 382/104 |
| 8,319,662 | B1 | 11/2012 | Bontemps et al. | |
| 2002/0059017 | A1 | 5/2002 | Yamane et al. | |
| 2003/0164753 | A1 * | 9/2003 | Gongolas | G09F 19/22 340/307 |
| 2006/0129451 | A1 * | 6/2006 | Kohanim | G06Q 30/02 705/14.58 |
| 2007/0126599 | A1 * | 6/2007 | Gembala | G08G 1/095 340/908 |
| 2008/0129543 | A1 * | 6/2008 | Lee | G08G 1/0955 340/908 |

(Continued)

OTHER PUBLICATIONS

USPTO, Non-Final Rejection, Jul. 25, 2019, re U.S. Appl. No. 16/369,910.

(Continued)

*Primary Examiner* — Adolf Dsouza
(74) *Attorney, Agent, or Firm* — Perry + Currier Inc.

(57) ABSTRACT

A traffic control system and method of operating a traffic control system are provided. The system includes a support base, a wireless interface, first and second collapsible traffic control structures, and a base station. The method involves expanding first and second collapsible traffic control structures, generating control signals and transmitting the control signals to the first and second traffic control structures to signal traffic.

15 Claims, 9 Drawing Sheets

(56) References Cited

U.S. PATENT DOCUMENTS

| | | | | |
|---|---|---|---|---|
| 2008/0198038 | A1* | 8/2008 | Yingst .................... | G08G 1/087 340/908 |
| 2014/0112242 | A1 | 4/2014 | Vilmur et al. | |
| 2015/0061896 | A1 | 3/2015 | Walther et al. | |
| 2017/0061791 | A1 | 3/2017 | Cherewka | |

OTHER PUBLICATIONS

USPTO, Final Rejection, Jun. 28, 2018 re U.S. Appl. No. 15/455,595.
USPTO, Notice of Allowance and Fees Due, Nov. 20, 2018 re U.S. Appl. No. 15/455,595.
USPTO, Non-Final Rejection, Dec. 14, 2017 re U.S. Appl. No. 15/455,595.
USPTO, Final Rejection, Apr. 30, 2020, re U.S. Appl. No. 16/369,910.

* cited by examiner

SYSTEM AND METHOD FOR MANAGING TRAFFIC AT A WORKSITE

CROSS-REFERENCE TO RELATED APPLICATIONS

This application is a continuation of co-pending U.S. patent application Ser. No. 17/337,736, filed Jun. 3, 2021, and entitled System and Method for Managing Traffic at a Worksite, which is a continuation of U.S. patent application Ser. No. 16/369,910, filed 29 Mar. 2019 and also entitled System and Method for Managing Traffic at a Worksite, which application is a continuation of U.S. patent application Ser. No. 15/455,595, filed 10 Mar. 2017 and also entitled System and Method for Managing Traffic at a Worksite, which application is a non-provisional of prior filed U.S. Provisional Application Ser. No. 62/306,840, filed 11 Mar. 2016 and entitled Smart Traffic Management System; and the application herein claims the priority of each of the foregoing applications and incorporates the entire contents of each of them by this reference.

FIELD

The present specification relates generally to a traffic management system and method, and more particularly to a portable traffic management system and method.

BACKGROUND

Conventional traffic management at worksites or other locations requiring traffic management typically use people (i.e. flagmen) with handheld signs or hand signals to control the flow of traffic. The flagmen typically stand in traffic or close to traffic such that drivers can properly see the signals and signs. In addition, for larger worksites, such as a construction site or traffic accident scene, more than one flagman is needed to properly ensure safety around the worksite. Accordingly, traffic management can require several flagmen to properly manage a site. Indeed, the demand for additional flagmen at a worksite can increase the cost of traffic management significantly. In addition, as mentioned above, flagmen need to stand relatively close to moving traffic in order to be effective at managing the traffic. This inevitably results in accidents causing injury or death.

Mechanical traffic management systems are known and can sometimes be used in the place of flagmen. However, mechanical systems are generally unable to effectively manage traffic flow in response to changing traffic conditions. Some traffic management systems use rudimentary sensors such as pressure tubes across a roadway which detect cars passing over, radar sensors, microwave sensors, and/or cameras.

SUMMARY

In accordance with an aspect of the invention, there is provided a system for managing traffic at a worksite. The system includes a traffic control signal. In addition, the system includes a wireless interface in communication with the traffic control signal, the wireless interface configured to receive control signals to operate the traffic control signal. Furthermore, the system includes a mast for supporting the traffic control signal. The system further includes a support base for supporting the mast on a surface. Also, the system includes a wireless control device configured to receive input, the input for controlling the traffic control signal. In addition, the system includes a base station in communication with the wireless control device and the wireless interface, the base station configured to receive the input from the wireless control device, generate the control signals and transmit the control signals to the traffic control signal.

The system may further include a sensor mounted on the mast, the sensor configured to collect traffic data proximate to the traffic control signal and to transmit the traffic data to the base station.

The sensor may be a camera.

The base station may be configured to generate the control signals automatically.

The control signals may be generated in response to the traffic data.

The system may further include an additional traffic control signal, the additional traffic control signal in communication with the base station.

The additional traffic control signal may operate as a slave of to the traffic control signal.

The base station may connect to a remote traffic control center external of the worksite via a cellular data connection.

The mast may be collapsible.

The support base may be configured to store the mast and the traffic control signal.

The system may further include a moveable gate arm connected to the mast, wherein in the moveable gate arm is configured to raise and lower to control traffic.

The system may further include a battery disposed in the support base, the battery for powering the traffic control signal.

The system may further include a solar panel, the solar panel for charging the battery.

In accordance with an aspect of the invention, there is provided a method of managing traffic at a worksite. The method involves receiving input, at a base station, from a wireless control device, wherein the input is for controlling a traffic control signal, wherein the traffic control signal is supported by a mast, the mast supported by a support base. In addition, the method involves generating control signals based at least partially on the input received, wherein the control signals are for operating the traffic control signal. Furthermore, the methods involve transmitting the control signals to the traffic control signal via a wireless interface, the wireless interface in communication with the traffic control signal.

The method may further involve collecting traffic data proximate to the traffic control signal.

The method may further involve transmitting traffic data to the base station.

The method may further involve generating control signals automatically in response to the traffic data.

In accordance with an aspect of the invention, there is provided a non-transitory computer readable medium encoded with codes. The codes are for directing a processor to receive input, at a base station from a wireless control device, wherein the input is for controlling a traffic control signal, wherein the traffic control signal is supported by a mast, the mast supported by a support base. In addition, the codes are for directing a processor to generate control signals based at least partially on the input received, wherein the control signals are for operating the traffic control signal. Furthermore, the codes are for directing a processor to transmit the control signals to the traffic control signal via a wireless interface, the wireless interface in communication with the traffic control signal.

The codes may further direct the processor to receive traffic data proximate to the traffic control signal.

The codes may further direct the processor to comprising directing the processor to transmit traffic data from the traffic control signal to the base station to generate control signals automatically in response to the traffic data.

BRIEF DESCRIPTION OF THE DRAWINGS

Reference will now be made, by way of example only, to the accompanying drawings in which.

DETAILED DESCRIPTION OF THE EMBODIMENTS

As used herein, any usage of terms that suggest an absolute orientation (e.g. "top", "bottom", "front", "back", etc.) are for illustrative convenience and refer to the orientation shown in a particular figure. However, such terms are not to be construed in a limiting sense as it is contemplated that various components will, in practice, be utilized in orientations that are the same as, or different than those described or shown.

Figure 1:
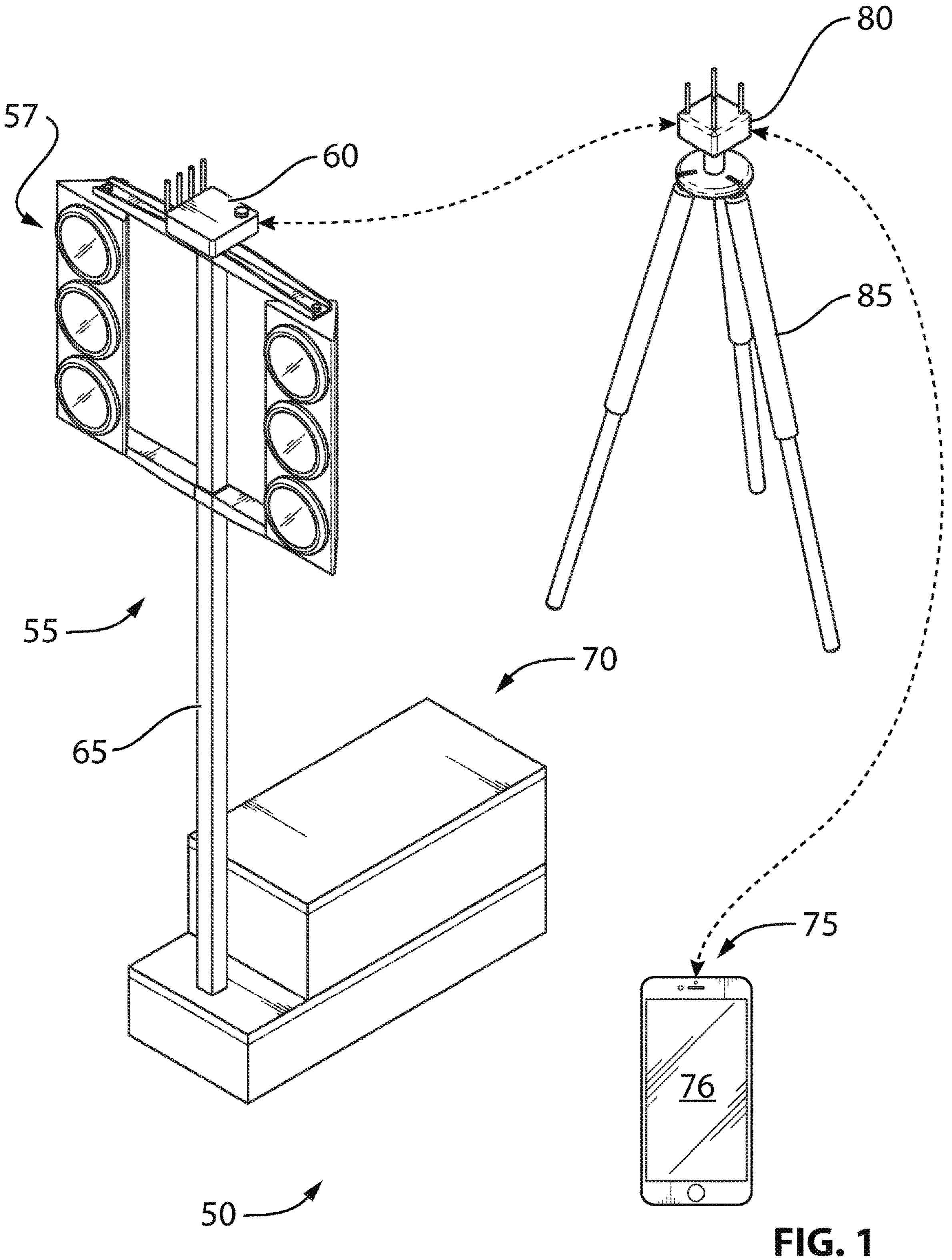
FIG. 1 is a schematic drawing of a system in accordance with an embodiment.

Referring to FIG. 1, a schematic representation of a traffic management system is generally shown at 50. It is to be understood that the system 50 is purely exemplary and it will be apparent to those skilled in the art with the benefit of the description provided herein that variations are contemplated. The system 50 includes a portable traffic control system 55, a base station 80 and a wireless control device 75.

The traffic control system 55 is generally configured to provide signals to drivers to control the flow of traffic. The signals provided to the drives are not particularly limited. For example, the signals to drivers can include visible and/or audible signals. Visible signals can include the use of screens, lights, or physical indicators, such as mechanically moveable barriers or signs. Audible signals can include the use of various sounds such as sirens, chirps, and/or low frequency sound wave that can provide a vibrational indication to the drivers in vehicles. In the present embodiment, the traffic control system 55 generally includes a traffic control signal 57 for providing the visible and/or audible signals to traffic, a wireless interface 60 for receiving signals from the base station 80, a mast 65, and a support base 70.

The support base 70 is generally configured to support the mast on a surface, such as a road surface, when the traffic control system 55 is deployed. Accordingly, the support base 70 generally includes a substantial mass such that the mast 65 would be held rigidly in place. For example, the support base 70 can include dense materials such as cement and heavy metals. In some embodiments, the support base 70 can include anchors (not shown) for securing the support base 70 to the surface with a fastener.

In the present embodiment, the wireless control device 75 is generally configured to receive input for controlling the traffic control signal 57 of the portable traffic control system 55. The wireless control device 75 is a portable electronic device and it will be apparent to those skilled in the art with the benefit of this description that a wide variety of portable electronic devices are contemplated. For example, the wireless control device 75 can include, without limitation, a cellular telephone, a portable email paging device, a personal digital assistant, a tablet computer, a netbook computer, a laptop computer, or an on-board computer in a vehicle. Other contemplated variations include devices which are not necessarily portable, such as desktop computers. In the present embodiment, the wireless control device 75 includes a display screen 76, which can also serve as a touchscreen input device for receiving user input. In other embodiments, the wireless control device 75 can further include various lights, such as various warning lights.

The manner by which the wireless control device 75 receives input is not particularly limited. In the present embodiment, the wireless control device 75 includes a screen 76 where an operator can use to enter input via the use of various virtual keys. In other embodiments, the input can be received via a plurality of keys, such as through a conventional keyboard. Further types of input devices are also contemplated. For example, a joystick, trackball, trackwheel, or optical camera or microphone can be use in addition to or in lieu of the touch screen.

The base station 80 is generally configured to receive the data from the wireless control device 75, and to generate control signals for operating the traffic control signal 57. The base station 80 is further configured to transmit the control signals to the traffic control system 55 via the wireless interface 60. It is to be appreciate by a person of skill in the art with the benefit of this description that the manner by which the base station 80 generates and transmits control signals based on data from the wireless control device 75 is not particularly limited and variations are discussed in greater detail below.

In the present embodiment, the base station 80 receives data from the wireless control device 75 and transmits control signals to the traffic control system 55 using wireless technology. In particular, the base station 80 can serve as a wireless hub and the traffic control system 55 and the wireless control device 75 can be devices connected to the hotspot. However, it is to be appreciated that the communications between the base station 80, the wireless control device 75, and the traffic control system 55 is not particularly limited and that other standards such as BLUETOOTH, mobile network standards, such as fourth generation (4G), third generation (3G), code division multiple access (CDMA), Groupe Spécial Mobile (GSM) or Long Term Evolution (LTE) standards, or non-standard radio frequency (RF) signals can be used. Other manners of wireless data transmission can also be used such as transmission signals outside the RF spectrum, for example infrared, or audio signal transmission techniques, such as sonar.

In the present embodiment, the base station 80 is supported by base station legs 85 to elevate the base station 80 to improve reception. It is to be appreciated that in other embodiments, the base station 80 can be mounted to an elevated location or vehicle such that the legs 85 can be omitted.

In general terms, the system 50 is generally configured to manage traffic at a worksite based on input from a wireless control device 75 for controlling the traffic control system 55 via a base station 80. It is to be re-emphasized that the structure shown in FIG. 1 is a non-limiting representation only. Notwithstanding the specific example, it is to be understood that other equivalent systems managing traffic can be devised to perform the same function as the system 50. For example, systems can include multiple traffic control systems 55, base stations 80 or even wireless control devices 75 which may be different types of devices.

Figure 2:
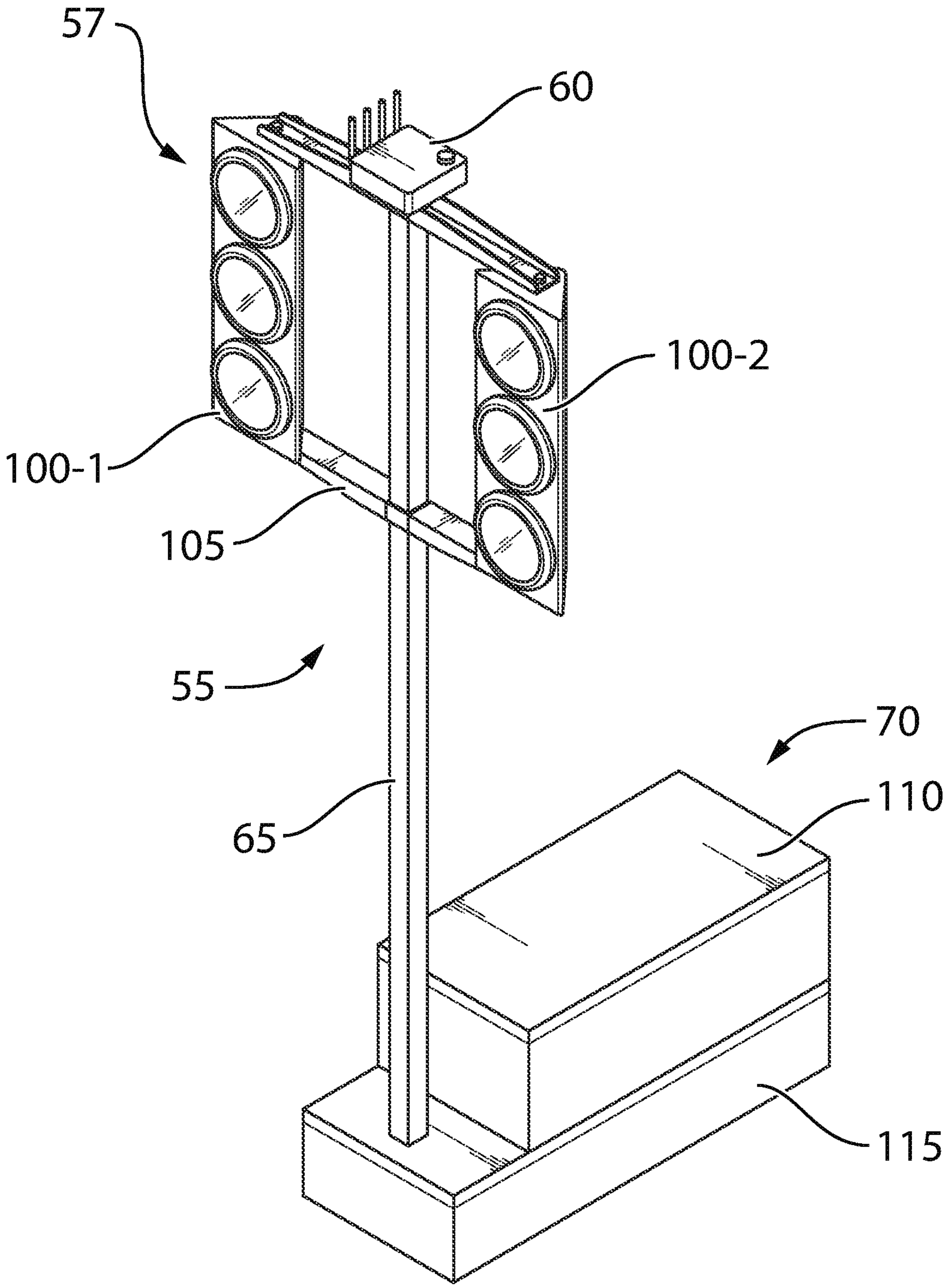
FIG. 2 is a schematic drawing of the traffic control system of the embodiment shown in FIG. 1.

Referring to FIG. 2, an embodiment of the traffic control system 55 is shown in greater detail. It is to be understood that the traffic control system 55 is purely exemplary and it will be apparent to those skilled in the art that a variety of traffic control systems are contemplated including additional embodiments described in greater detail below. In the present embodiment, the traffic control system 55 includes a wireless interface 60, the mast 65, traffic lights 100-1 and 100-2, a support beam 105, a storage box 110, and a battery compartment 115.

In operation, the wireless interface 60 is generally configured to receive control signals from the base station 80. The wireless interface 60 is also in communication with the traffic control signal 57 and uses the control signals from the base station 80 to control the traffic control signal 57. The base station 80 receives data from the wireless control device 75 to generate and transmit control signals to the traffic control system 55 using wireless technology. However, it is to be appreciated that the communications between the base station 80, the wireless control device 75, and the traffic control system 55 is not particularly limited and that other standards such as BLUETOOTH, mobile network standards, such as fourth generation (4G), third generation (3G), code division multiple access (CDMA), Groupe Special Mobile (GSM) or Long Term Evolution (LTE) standards, or non-standard radio frequency (RF) signals can be used.

The manner by which the traffic control signal 57 is controlled is not particularly limited. For example, the traffic control system 55 can include a local processing unit (not shown) for managing the operation of the traffic control signal 57. For example, the local processing unit can include a timer that toggles the state of the traffic control signal 57 and the control signals received at the wireless interface 60 can then be used to adjust parameters, such as timing and sequence. Alternatively, the wireless interface 60 can directly control the traffic control signal 57 with the control signals which can be used to directly operate the hardware of the traffic control signal 57, such as turning on a specific light or engaging a motor to move a sign or barrier in some embodiments.

The mast 65 is connected to the support base and generally configured to support the traffic control signal 57 at a suitable height during operation such that the traffic control signal 57 is visible to drivers. In terms of providing physical support, the mast 65 is mechanically structured to support the weight of the traffic control signal 57 and withstand some typical forces that may be caused by weather or passing vehicles. The mast 65 is typically constructed from materials with suitable mechanical properties. Some examples of suitable materials include stainless steel, titanium, plastics, composites, and other materials with similar structural stability characteristics. In the present embodiment, the mast 65 is optionally engineered break away from the support base 70 during a collision, such as if a vehicle crashes into the traffic control system 55. It is to be appreciated by a person skilled in the art that manner by which the mast 65 breaks away is such that the mast and/or other components of the traffic control system 55 would not enter the passenger compartment of a vehicle. For example, the connection point of the mast 65 and the support base 70 can be pivotally connected such that a collision would simply rotate the mast 65 about the pivot point to remain under the vehicle which collided into the traffic control system 55.

In the present embodiment, the traffic control signal 57 includes traffic lights 100-1 and 100-2 (collectively, traffic lights 100, and generically, traffic light 100—this nomenclature is used elsewhere herein) supported by the beam 105. The traffic lights 100-1 and 100-2 are not particularly limited and generally include a red light at the top, a yellow light in the middle and a green light at the bottom. The light source of the traffic lights 100-1 and 100-2 can include any manner that produces a sufficient brightness of light for the application. For example, each of the light sources can include an incandescent light bulb, or a light emitting diode (LED). Although the present embodiments illustrate a pair traffic lights 100 with three colored lights, it is to be appreciated that variations are contemplated. For example, instead of a pair of traffic lights, a single traffic light can be substituted. The orientation of the traffic lights 100 is also not particularly limited and the traffic lights 100 can be horizontally oriented. As another example of a variation, the traffic lights 100 can include more or fewer lights, such as omitting the yellow light or adding in directional control lights.

In the present embodiment, the support base 70 includes an optional storage box 110 for storing the traffic control system 55 during transport or storage. The manner by which the traffic control system 55 is stored is not particularly limited. For example, the storage box 110 can be dimensioned to fit the wireless interface 60, the mast 65, the beam 105, and the traffic lights 100. In some embodiments, the mast 65 can be collapsible (e.g. telescopically) or foldable to more readily fit within the storage box 110. It is to be appreciated by a person of skill in the art with the benefit of this description that when the traffic control system 55 is deployed, the storage box 110 can also be filled with another material, such as sand or water, to provide greater stability by adding mass to the support base 70. It is to be appreciated that in some embodiments, the storage box can be omitted and the support based 70 can simply include a weight such as a cement block.

Furthermore, the support base 70 also includes an optional battery compartment 115 in the present embodiment. The battery compartment 115 is generally used to store a battery such as rechargeable battery for embodiments where the traffic control system 55 is powered with a battery. They type and size of the battery is not particularly limited and can be varied depending on the specific application. For example, for applications where the traffic control system 55 is intended to be operated for periods typically not exceeding 8 hours such as to clear an accident scene, the battery compartment 115 can be used to store a lithium ion battery, lead acid battery, or any other suitable energy storage device capable of providing at least 8 hours of operation. For applications requiring additional battery life, such as 24 hours, a larger batter pack can be place in the battery compartment 115 to provide a longer period of operation between charging. It is to be appreciated that in some embodiments not powered by battery that the battery compartment 115 can be omitted.

Figure 3:
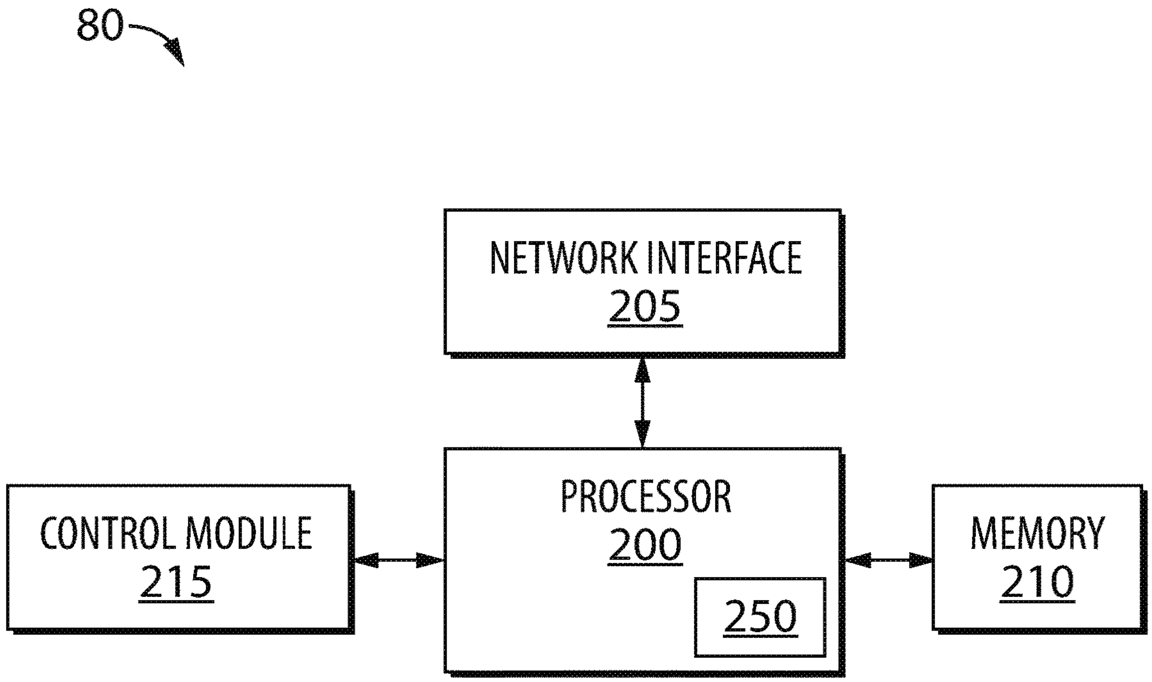
FIG. 3 is a schematic drawing showing the components of the base station of the embodiment shown in FIG. 1.

Referring to FIG. 3, a schematic block diagram illustration of components of the base station 80 is provided. It is to be understood that the base station 80 is purely exemplary and it will be apparent to those skilled in the art that a variety of base station devices are contemplated. In the present embodiment, the base station 80 includes a processor 200, a network interface 205, a memory storage unit 210, and a control module 215. The network interface 205, the memory storage unit 210, and the control module 215 are each in electrical communication with the processor 200.

The network interface 205 is not particularly limited and can include various wireless network interface devices such as a wireless network interface controller (NIC). In particular, the network interface 205 is generally configured to the wireless interface 60 and the wireless control device 75. For example, the network interface 205 can connect to the wireless interface 60 and the wireless control device 75 using WIFI, BLUETOOTH, and/or via another RF signal. In particular, the network interface 205 is configured to receive input from the wireless control device 75 and pass the input to the processor 200 for further processing as described further below.

The network interface 205 can also provide connectivity to an external network such as a mobile network via known standards such as fourth generation (4G), third generation (3G), code division multiple access (CDMA), Groupe Special Mobile (GSM) or Long Term Evolution (LTE). It is to be appreciated that by providing access to an external network, the based station 80 can be connected to a remote traffic control center external of the worksite, where additional processing capacity may be available to analyze and optimize the operation of the system 50 based on traffic conditions. The remote traffic control center can be a physical location, such as a company headquarters, or it can be a cloud server. In the present embodiment, a server collects the traffic data for the purpose of creating a reviewable log for subsequent or real time monitoring at a remote location. In other embodiments, the server can be used to perform complex traffic optimization on the traffic data that can be used to better control the traffic control systems around the worksite.

It is to be appreciated with the benefit of this description that the base station 80 can use more than one method of communication with either the wireless control device 75 or the traffic control system 55, where the multiple methods function as redundant backup systems. Accordingly, the network interface cab be configured to communicate using multiple standards. Alternatively, a separate network interface can be used within the base station 80 for each communication standard. In particular, since failure of the system 50 can result in the direction of traffic into dangerous situations, several failsafe procedures are generally built into the system. For example, redundant communications provide a backup when a frequency or mode of communication is disrupted, such as due to interference. In other embodiments, a failsafe can involve using the traffic control system 55 to stop all cars until the problem is resolved. The manner by which a failure is detected is not particularly limited. For example, the base station 80 can periodically ping the traffic control system 55 and the wireless control device 75 and listen for a response. Accordingly, if no response is received within an acceptable time, the system 50 can enter a failure mode as one of the components is no longer responding. The causes of failure are not particularly important and can include a battery failure or a destructive event such as an accident involving the traffic control system 55.

The memory storage unit 210 can be of any type such as non-volatile memory (e.g. Electrically Erasable Programmable Read Only Memory (EEPROM), Flash Memory, hard disk, floppy disk, optical disk, solid state drive, or tape drive) or volatile memory (e.g. random access memory (RAM)). Although the memory storage unit 210 is generally a type of non-volatile memory because of the robust nature of non-volatile memory, some embodiments can use volatile memory in situations where high access speed is desired. In the present embodiment, the memory storage unit 210 is a non-volatile memory unit instructions 250 for directing the processor 200 to carry out various functions. In addition, the memory storage unit can be used to store and record logs and traffic data as described further below.

The processor 200 is generally configured to execute programming instructions 250 to generate control signals and to send and receive data via the network interface 205. In the present embodiment, the programming instructions 250 configure the processor 200 to receive input data from a wireless control device 75. The processor 200 subsequently determines what functionality the input data is requesting and generates a control signal to be sent to the wireless interface 60 of the traffic control system 55.

The manner by which the control signals are generated are not particularly limited and can include variations. For example, the control signals can be generated automatically in a "automatic mode" based on a predetermined sequence of control signals stored managed by the control module 215. In this example, the memory storage unit 210 can store a series of control signals wo be used by the control module 215. The series of control signals can each be a command to turn on or off a light in the traffic lights 100, such as cycling between the green, yellow, and red lights based on fixed time periods, such as displaying each of the lights for one minute, 5 second, and another minute, respectively. To begin this predetermined sequence, the input received from the wireless control device 75 be a command to begin operating in an "automatic mode"

Although the present embodiment show the control module as a separate component in the base station 80, it is to be appreciated that the control module 215 can be a set of instructions carried out by the processor 200.

The input from the wireless control device 75 can be a command to toggle between the "automatic mode" and a "manual mode". In the "manual mode", the control signals can be generated manually based on the input received from the wireless control device 75. For example, input from the wireless control device 75 can represent a command to turn on a red light on the traffic light 100. The command is processed by the processor 200 which sends the control signal to the traffic control system 55 to turn on the red light.

Figure 4:
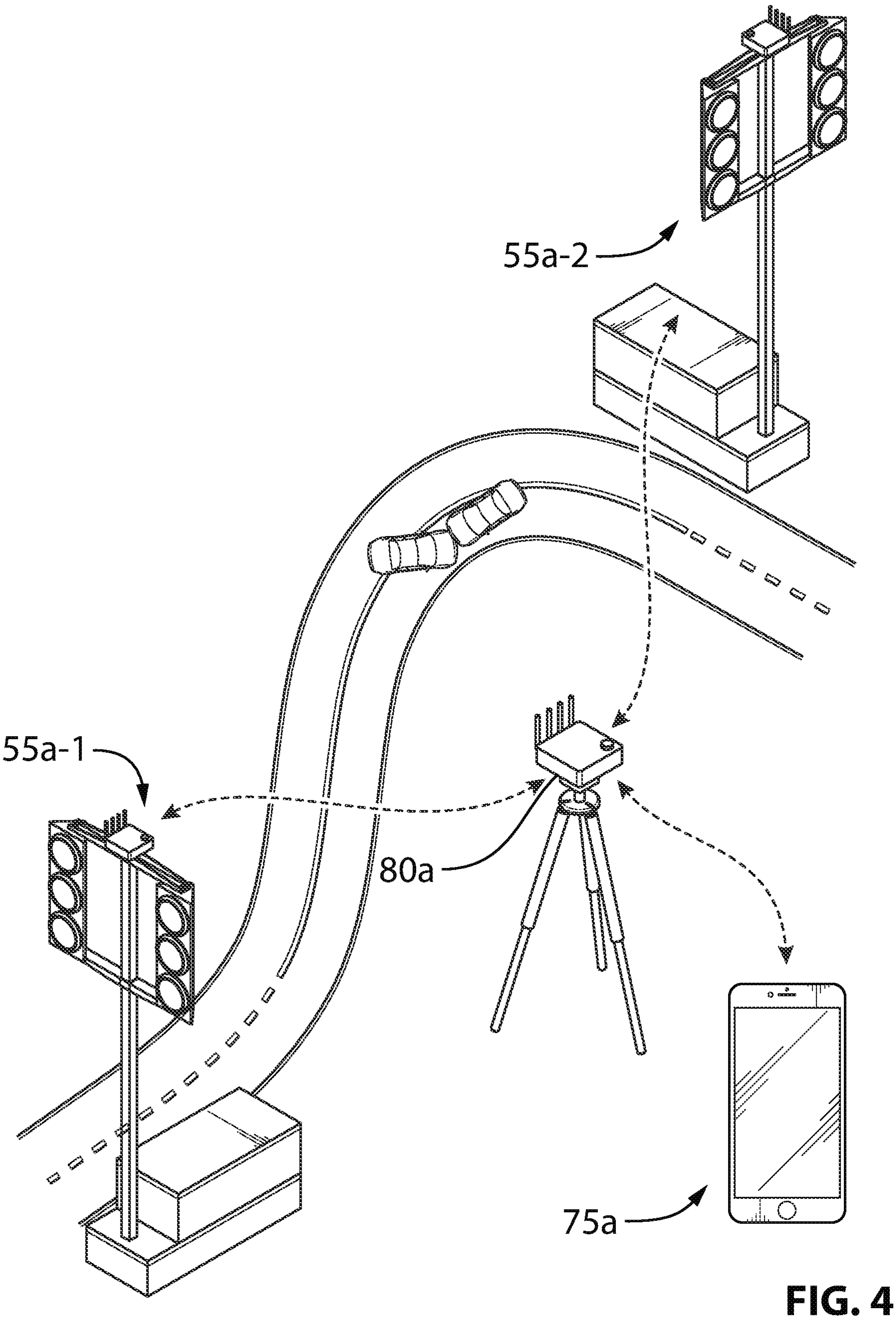
FIG. 4 is a schematic drawing of a system in accordance with another embodiment.

In FIG. 4, another embodiment of a traffic management system **50*a* is shown. Like components of the system 50 bear like reference to their counterparts in the system 50, except followed by the suffix "a". The traffic management system 50*a* includes a first portable traffic control system 55*a*-1, a second portable traffic control system 55*a*-2 (collectively, traffic control systems 55*a*, and generically, traffic control system 55*a*), a base station 80*a* and a wireless control device 75*a***.

In the present embodiment, the system **50*a* includes two traffic control systems 55*a* for managing traffic at a worksite, in this case a car accident scene. Each of the traffic control systems 55*a* are in communication with the base station 80*a*, and includes a traffic control signal for managing traffic from two separate locations. In the present embodiment, the worksite is located at a bend in a road blocking one lane of the two-lane road. Accordingly, opposing traffic would need to share the single available lane to pass through the worksite. The traffic control systems 55*a*** are deployed at each end of the bend and are used to allow traffic through in one direction at a time.

It is to be appreciated that in order to have the traffic control systems **55*a* operate to allow traffic to pass through the worksite, the operation of the traffic control systems 55*a* are coordinated. For example, the base station 80*a* prevents both traffic control systems 55***a* from displaying a "green" light, which can cause an additional accident as opposing traffic would be driving around the corner in a single lane. Therefore, the control module of the base station 80*a* would need to ensure that both traffic control systems 55*a* are not simultaneous "green". The manner by which the control module avoids this is not particularly limited. In the present embodiment, the traffic control systems 55*a* can be synchronized by the base station 80*a* such that the traffic control system 55*a*-1 is designated a master and the traffic control system 55*a*-2 is designated a slave. Accordingly, the traffic control signal of the traffic control system 55*a*-2 is a slave to the traffic control signal of the traffic control system 55*a*-1 and necessary put in the opposite state. Therefore, the entire system 50*a* can be controlled by adjusting only the operation of the traffic control system 55*a*-1.

Figure 5A:
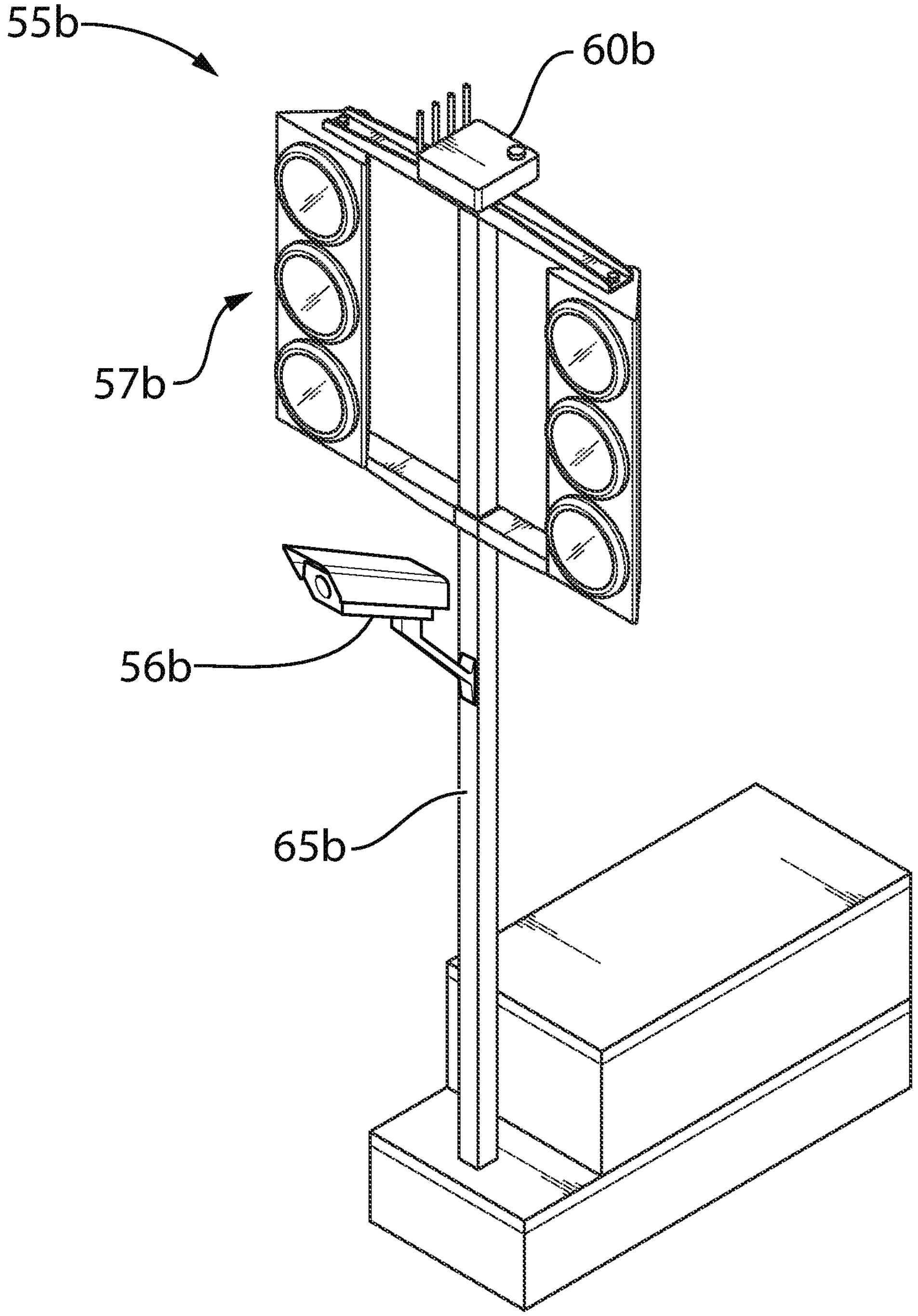
FIGS. 5*a-d* are a schematic drawings of traffic control systems in accordance with other embodiments.

Referring to FIG. 5*a*, another embodiment of a traffic control system 55*b* is shown. Like components of the traffic control system 55*b* bear like reference to their counterparts in the traffic control system 55, except followed by the suffix "b". The traffic control system 55*b* includes a sensor 56*b* mounted on the mast 65*b*. The sensor 56*b* is generally configured to collect traffic data and is positioned near the traffic control signal. In the present embodiment, the sensor 56*b* is in communication with the wireless interface 60*b* and configured to transmit the traffic data to the base station 80.

It is to be appreciated that the traffic data collected is not particularly limited and can be any data that can provide an indication of the traffic conditions. In the present embodiment, the sensor 56*b* is a camera collecting images. The images are transmitted to the base station 80, where the processor 200 can process the images to determine the traffic conditions using various image recognition methods to determine the number of cars as well as their speeds and direction of travel. Accordingly, if the images indicate a large number of vehicles lined up in front of the traffic control system 55*b*, the processor 200 forward the information to the control module 215 automatically, where the control module 215 generate a control signal for transmission back to the traffic control system 55*b* to allow vehicles to pass to alleviate the traffic congestion. In other embodiment, the images can be analyzed at the traffic control system 55*b* and the traffic data can be a number, such as a number representing the number of cars or the time delay. In other embodiments, instead of using the control module 215, the base station 80 can transmit the images to a remote traffic center for analysis to optimize the operation of the traffic control system 55*b*.

Alternatively, the images can be relayed by the base station 80 to a wireless control device 75 for displaying on a display screen 76. Accordingly, an operate can then easily view the traffic conditions and manually control the traffic control system 55*b* using the wireless control device 75.

In other embodiments, the sensor 56*b* can be a ranging sensor such as a microwave, radar, lidar, and photovoltaic sensor.

Figure 5B:
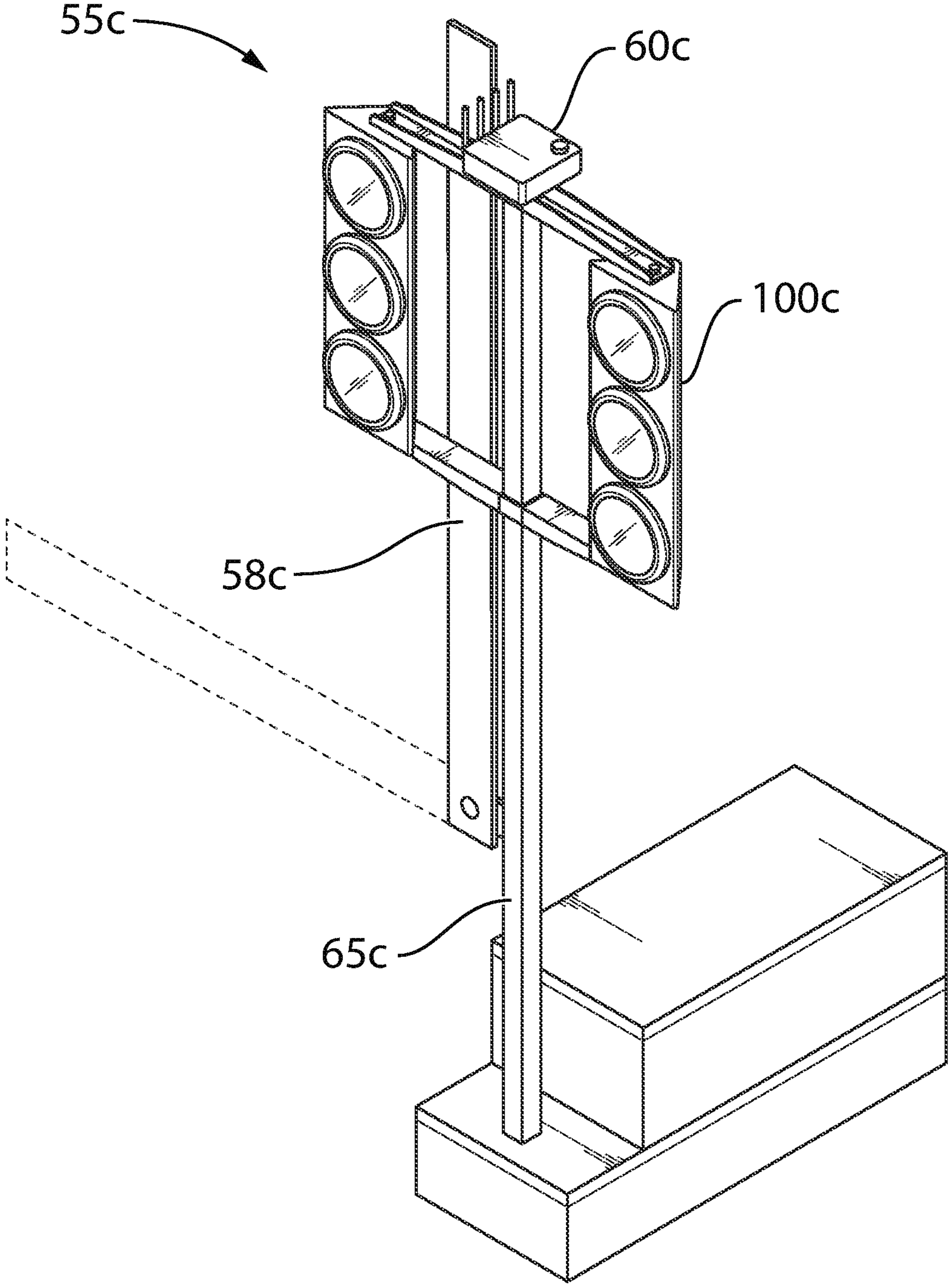

Referring to FIG. 5*b*, another embodiment of a traffic control system 55*c* is shown. Like components of the traffic control system 55*c* bear like reference to their counterparts in the traffic control system 55, except followed by the suffix "c". The traffic control system 55*c* includes a moveable gate arm 58*c* connected to the mast 65*c*. In the present embodiment, the gate arm 58*c* is pivotally connected to the mast 65*c* and configured to move between a raised position to allow traffic to flow past and a lowered position to act as a barrier to prevent traffic from flowing through. In other embodiments, the arm can telescope between a contracted position and an extended position.

Although the present embodiment of the traffic control system 55*c* includes a traffic lights 100*c*, it is to be appreciated by a person of skill in the art with the benefit of this description that the traffic lights 100*c* can be omitted and the gate arm 58*c* can be used along to control traffic flow alone.

Figure 5C:
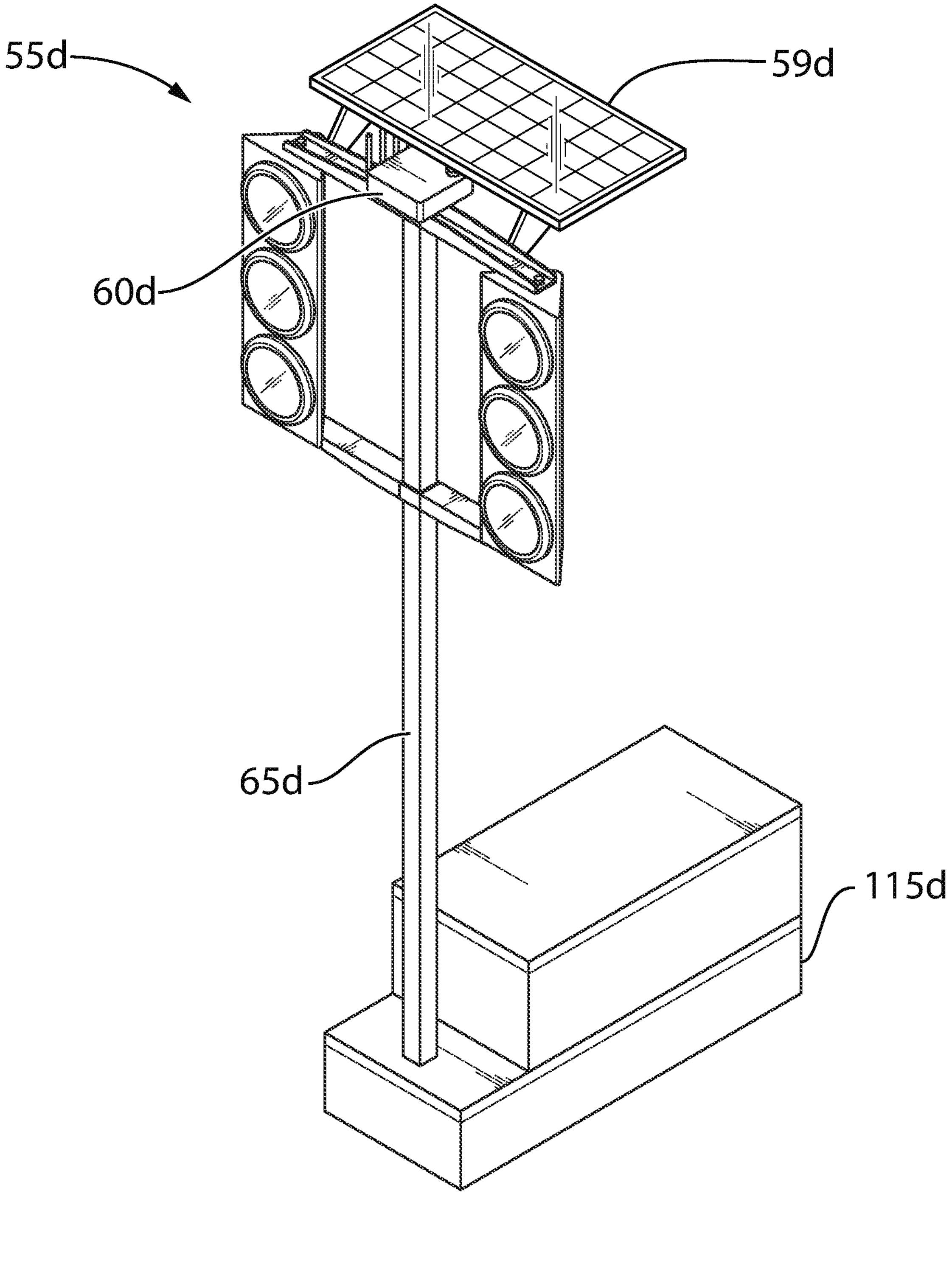

Referring to FIG. 5*c*, another embodiment of a traffic control system 55*d* is shown. Like components of the traffic control system 55*d* bear like reference to their counterparts in the traffic control system 55, except followed by the suffix "d". The traffic control system 55*d* includes a solar panel 59*d* for charging a battery in the batter compartment 115*d*. It is to be appreciated that the solar panel 59*d* can also be used to power the traffic control system 55*d* without a battery; however, this would limit the use of the traffic control system 55*d* to ideal weather conditions. By adding the solar panel 59*d*, the traffic control system 55*d* can be installed at a worksite for longer periods of time without the need to remove the traffic control system 55*d* for charging or to bring a charging station to the worksite.

Figure 5D:
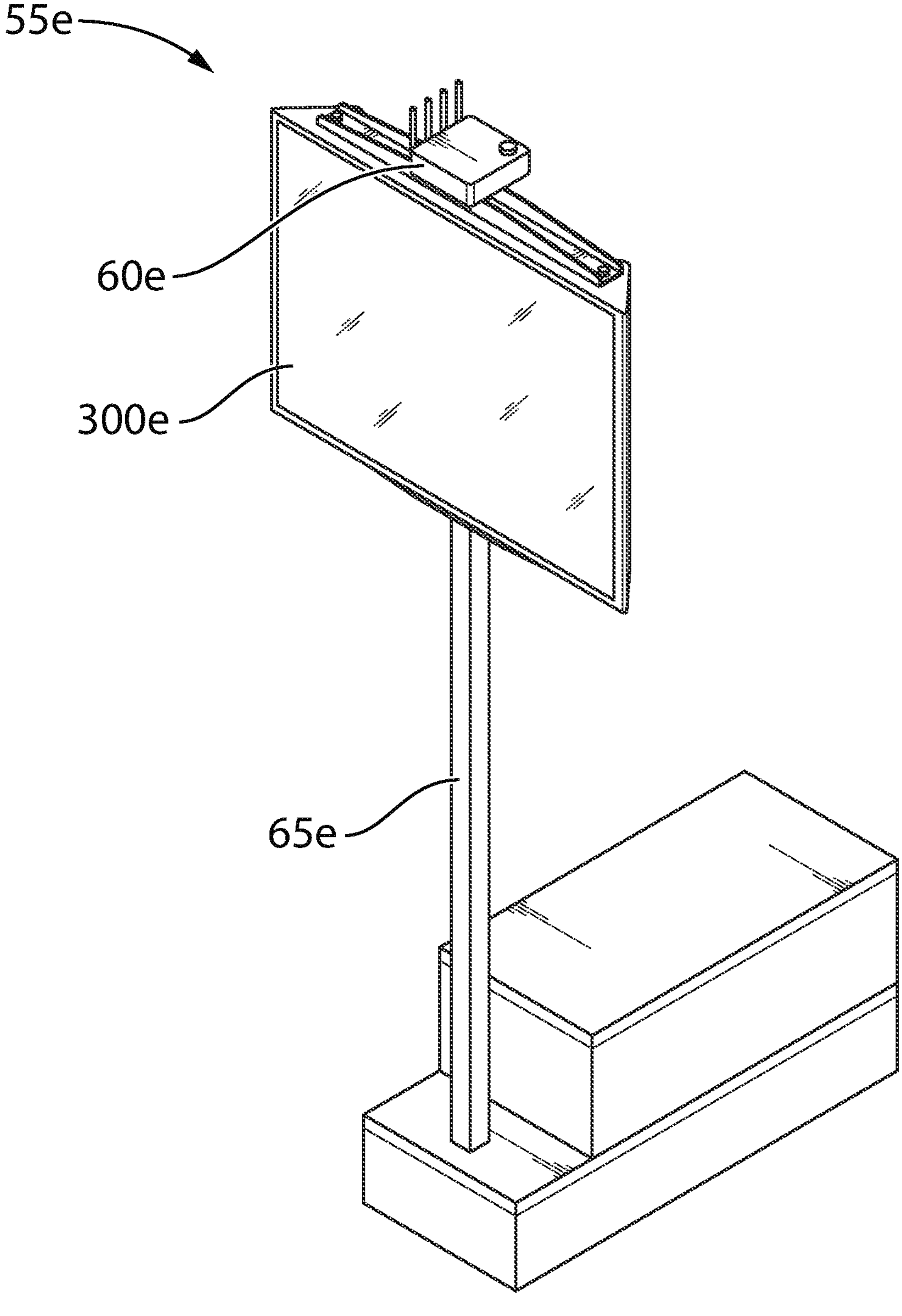

Referring to FIG. 5*d*, another embodiment of a traffic control system 55*e* is shown. Like components of the traffic control system 55*d* bear like reference to their counterparts in the traffic control system 55, except followed by the suffix "e". The traffic control system 55*e* includes a display 300*e*. The display 300*e* is not particularly limited and can include any display capable of presenting a message to traffic. For example, the display 300*e* can include one or more light emitters such as an array of light emitting diodes (LED), liquid crystals, plasma cells, or organic light emitting diodes (OLED).

Figure 6A:
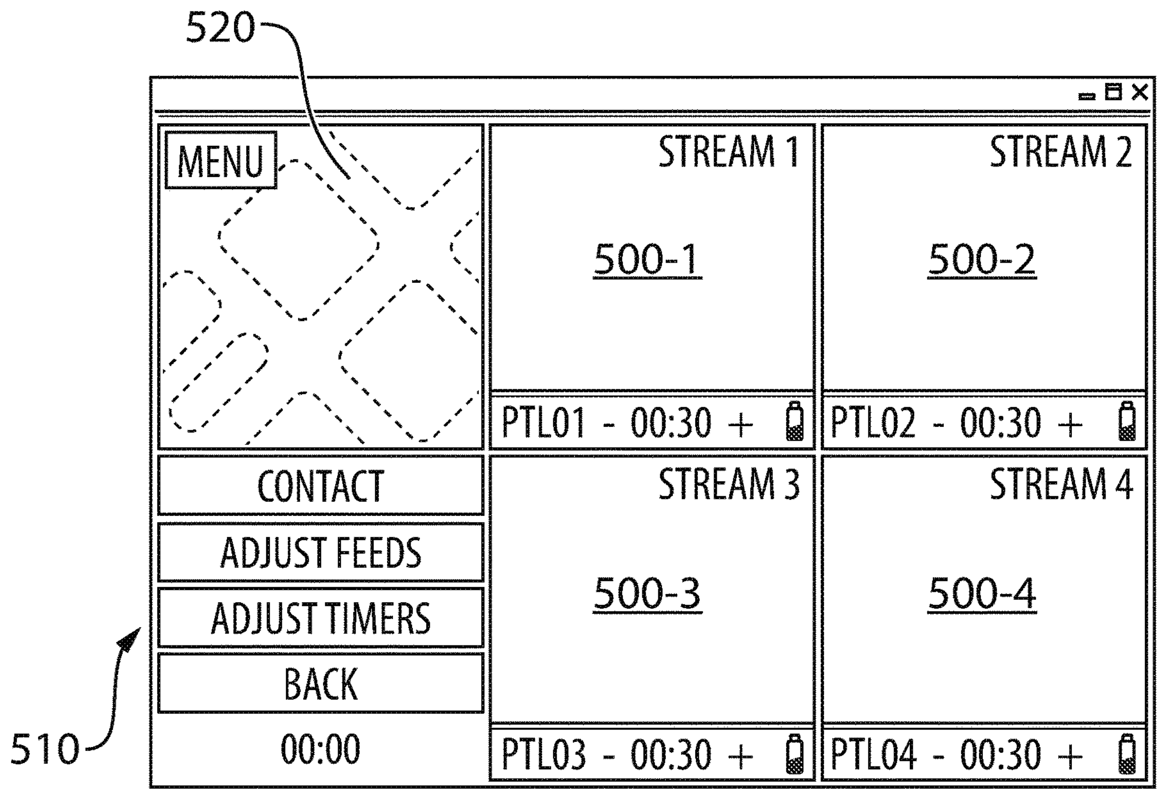
FIGS. 6*a-b* are screenshot displays on a device in accordance with an embodiment.
Figure 6B:
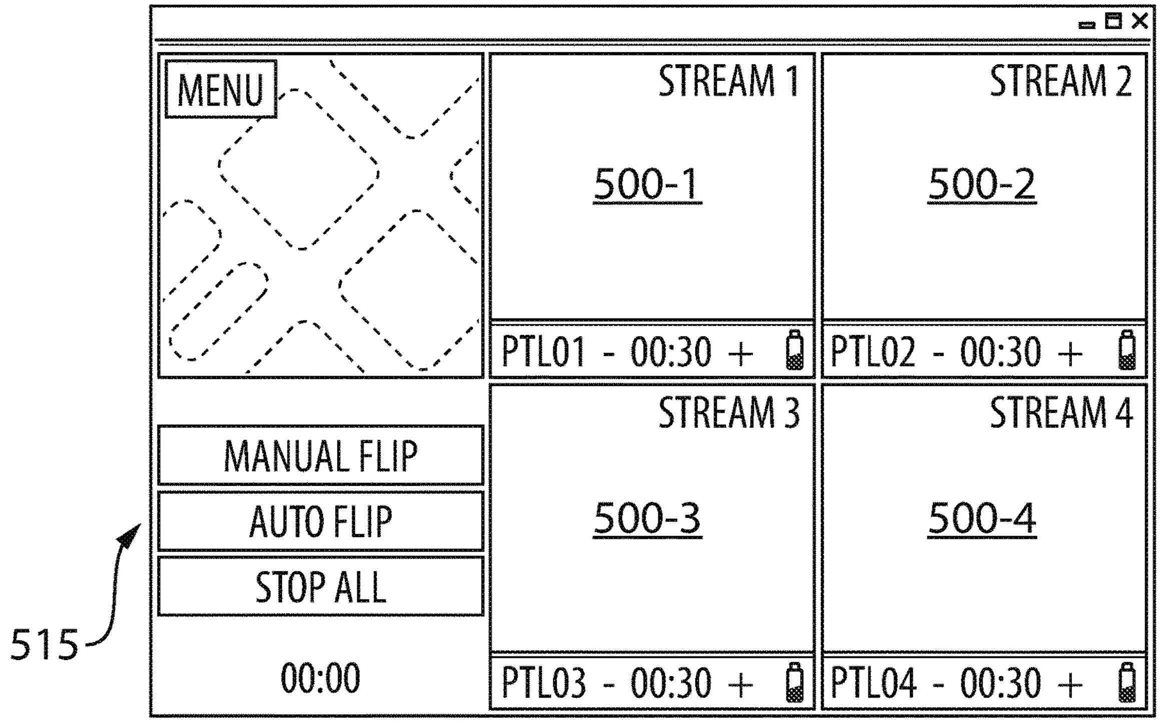

Referring to FIGS. 6*a* and 6*b*, screen shots of the display screen 76 of the wireless control device 75 are shown. Referring specifically to FIG. 6*a*, a home screen with four video feeds 500-1, 500-2, 500-3, and 500-4 (collectively, feeds 500, and generically, feed 500). In the present embodiment, each feed 500 is an image from a camera mounted on a traffic control system. Accordingly, the screen shown in FIG. 6*a* is connected to a system with at least four traffic control systems. In addition, a menu 510 with various options for controlling the traffic control systems is shown as well as a map 520 of the area where the system is deployed. Using the display shown in FIG. 6*a*, an operator can monitor the entire worksite from the safety of a location far away from the flow of traffic, such as in the cab of a truck. Using the menu 515, the operator can manually adjust the various traffic control signals. The feeds 500 allow the operator to observe the traffic and make adjustments accordingly.

It is to be appreciated by a person of skill in the art with the benefit of this description that the screen shots shown in FIGS. 6*a* and 6*b* are not particularly limited and that numerous layouts can be used. In some embodiments, the wireless control device 75 can present options to customize the views. For example, although FIGS. 6*a* and 6*b* show four feeds, it is to be understood that more or less feeds 500 can be shown simultaneous. In some embodiments, the feeds 500 can be omitted when the system is operating in "automatic mode"

Referring specifically to FIG. 6*b*, another screen with the four video feeds 500-1, 500-2, 500-3, and 500-4. In the present embodiment, the menu is configured to allow an operator to flip a light from one state to another, such as from green to red.

Various advantages will now be apparent. Of note is the ability to deploy a lightweight traffic management system at a worksite connected by a base station. The traffic management system provides traffic management without having a need for a flagman and thus reducing the probability accidents causing personal injury at worksites. As described above, the traffic management system is not particularly limited and can include additional components when needed. For example, additional base stations can be added to extend the range of the traffic management system for large sites and addition traffic control systems can be added if there are more than one or two flows of traffic that need to be controlled. In addition, the system allows for data to be sent to a remote cloud server from where the system can be controlled such that it would not be necessary to staff a person at the worksite. Sending data to the cloud also allows for traffic analysis to be carried out by dedicated traffic servers that can perform more complex traffic optimization analysis.

While specific embodiments have been described and illustrated, such embodiments should be considered illustrative only and should not serve to limit the accompanying claims.

What is claimed is:

1. A traffic control system comprising:

a support base configured to support the traffic control system on a surface and to store the traffic control system;

a first traffic control structure configured to signal traffic, the first traffic control structure comprising a collapsible mast supporting traffic lights, the mast configured to move between a first storage position stored in the support base and a first operational position extending from the support base to signal the traffic;

a second traffic control structure configured to signal the traffic, the second traffic control structure comprising a moveable gate arm configured to move between a second storage position stored in the support base and a second operational position extending from the support base to signal traffic; and a wireless interface in communication with the first traffic control structure and the second traffic control structure, the wireless interface configured to receive control signals to operate one or both of the first traffic control structure and the second traffic control structure; and a base station in communication with the wireless interface, the base station configured to generate the control signals and transmit the control signals to the traffic control system.

2. The traffic control system of claim 1, wherein the mast is telescopically collapsible to move between the first storage position and the first operational position.

3. The traffic control system of claim 1, wherein the mast is foldable to move between the first storage position and the first operational position.

4. The traffic control system of claim 1, wherein the gate arm is telescopically collapsible to move between the second storage position and the second operational position.

5. The traffic control system of claim 1, wherein the gate arm is pivotally connected to the mast to moved between a raised position to allow traffic to flow past and a lowered position to act as a barrier to prevent traffic from following through.

6. The traffic control system of claim 1, wherein the gate arm is substantially parallel to the mast in the raised position, and wherein the gate arm is substantially perpendicular to the mast in the lowered position.

7. The traffic control system of claim 1, wherein the base station operates in an automatic mode, wherein a control module of the base station is configured to generate the control signals automatically.

8. The traffic control system of claim 7, further comprising a sensor mounted on the mast, the sensor configured to collect traffic data proximate to the traffic control signal and to transmit the traffic data to the base station.

9. The traffic control system of claim 8, wherein the control module is configured to generate the control signals automatically in response to the traffic data.

10. The traffic control system of claim 1, wherein the base station operates in a manual mode, wherein a control module of the base station is configured to generate the control signals based on input received from a wireless control device.

11. The traffic control system of claim 10, wherein the input is received from the wireless control device in accordance with a first communication standard; and wherein the base station is configured to transmit the control signals to the traffic control signal in accordance with a second communication standard, different from the first communication standard.

12. A method of operating a traffic control system comprising:

deploying a first traffic control structure and a second traffic control structure from storage in a support base of the traffic control system to respective operational positions, wherein the first traffic control structure and the second traffic control structure are configured to signal traffic;

generating, at a base station, control signals for operating at least one of the first traffic control structure and the second traffic control structure; and transmitting the control signals to the at least one of the first traffic control structure and the second traffic control structure via a wireless interface, the wireless interface in communication with the first traffic control structure and the second traffic control structure.

13. The method of claim 12, further comprising:

collecting traffic data; and generating the control signals automatically in response to the traffic data.

14. The method of claim 12, further comprising:

receiving input from a wireless control device; and generating the control signals based on the input.

15. The method of claim 14, wherein the input is received from the wireless control device in accordance with a first communication standard; and wherein the control signals are transmitted to the wireless interface in accordance with a second communication standard different from the first communication standard.

* * * * *